(12) United States Patent
Yang et al.

(10) Patent No.: US 12,483,040 B2
(45) Date of Patent: Nov. 25, 2025

(54) PROVISIONING DEVICE AND METHOD FOR BATTERY STATE DIAGNOSIS AND ID ASSIGNMENT

(71) Applicant: LG ENERGY SOLUTION, LTD., Seoul (KR)

(72) Inventors: Seong Yeol Yang, Daejeon (KR); Ji Won Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 721 days.

(21) Appl. No.: 17/796,237

(22) PCT Filed: Jun. 24, 2021

(86) PCT No.: PCT/KR2021/007961
§ 371 (c)(1),
(2) Date: Jul. 28, 2022

(87) PCT Pub. No.: WO2022/005105
PCT Pub. Date: Jan. 6, 2022

(65) Prior Publication Data
US 2023/0187945 A1    Jun. 15, 2023

(30) Foreign Application Priority Data

Jun. 29, 2020    (KR) .................. 10-2020-0079599

(51) Int. Cl.
*H02J 7/00* (2006.01)
*G01R 31/36* (2020.01)
*G01R 31/396* (2019.01)

(52) U.S. Cl.
CPC ...... *H02J 7/00032* (2020.01); *G01R 31/3646* (2019.01); *G01R 31/3648* (2013.01); *G01R 31/396* (2019.01); *H02J 7/0047* (2013.01)

(58) Field of Classification Search
CPC .. H02J 7/00032; H02J 7/0047; G10R 31/396; G10R 31/3646
See application file for complete search history.

(56) References Cited

U.S. PATENT DOCUMENTS 8,765,276 B2 *  7/2014  Baglino .............. H01M 50/204
                                                   429/61
9,214,822 B2   12/2015  Hartley et al.
(Continued)

FOREIGN PATENT DOCUMENTS

| CN | 105895973 A | 8/2016 |
|----|-------------|--------|
| CN | 107689995 A | 2/2018 |

(Continued)

OTHER PUBLICATIONS

Extended European Search Report dated Apr. 12, 2023, issued by the European Patent Office in corresponding European Patent Application No. 21833856.4.
(Continued)

*Primary Examiner* — Robert Grant
(74) *Attorney, Agent, or Firm* — Morgan, Lewis & Bockius LLP

(57) ABSTRACT

A provisioning device includes a communication module capable of communicating with a plurality of battery management systems included in the battery pack; and a processor, wherein the processor causes the communication module to wirelessly transmit a provisioning signal for switching at least one battery management system of the plurality of battery management systems to a provisioning mode, receives state information of the battery and the battery management system from the plurality of battery management systems through the communication module, and assigns an ID of a network of the battery pack and an ID of each of the battery management system based on the state (Continued)

information of the battery management system received through the communication module.

20 Claims, 7 Drawing Sheets

(56) References Cited

U.S. PATENT DOCUMENTS

| | | | |
|---|---|---|---|
| 9,559,530 B2 | 1/2017 | Lee | |
| 9,610,857 B2 | 4/2017 | Dai | |
| 9,961,857 B1 * | 5/2018 | Lee | A01H 5/10 |
| 2010/0182154 A1 | 7/2010 | Kawai et al. | |
| 2011/0003183 A1 | 1/2011 | Baglino | |
| 2011/0004438 A1 | 1/2011 | Baglino et al. | |
| 2014/0354291 A1 | 12/2014 | Kikuchi et al. | |
| 2015/0318718 A1 | 11/2015 | Ishibashi | |
| 2016/0247389 A1 | 8/2016 | Shimizu et al. | |
| 2016/0272083 A1 | 9/2016 | Dai | |
| 2016/0272085 A1 | 9/2016 | Dai | |
| 2016/0325638 A1 | 11/2016 | Dai | |
| 2016/0339797 A1 | 11/2016 | Dai | |
| 2017/0158059 A1 | 6/2017 | Dai | |
| 2018/0126864 A1 | 5/2018 | Dai | |
| 2019/0242949 A1 | 8/2019 | Lemkin et al. | |
| 2019/0260097 A1 | 8/2019 | Kwon et al. | |
| 2020/0006815 A1 | 1/2020 | Hwang et al. | |
| 2020/0036194 A1 | 1/2020 | Park et al. | |
| 2020/0200828 A1 | 6/2020 | Sung | |
| 2021/0278468 A1 | 9/2021 | Kojima et al. | |
| 2021/0336301 A1 | 10/2021 | Hwang et al. | |
| 2022/0137140 A1 | 5/2022 | Yoshimoto et al. | |

FOREIGN PATENT DOCUMENTS

| | | |
|---|---|---|
| CN | 110933200 A | 3/2020 |
| JP | H8-110993 A | 4/1996 |
| JP | 5710013 B2 | 4/2015 |
| JP | 2019-527528 A | 9/2019 |
| JP | 6630156 B2 | 1/2020 |
| JP | 2020-507301 A | 3/2020 |
| JP | 2020-92488 A | 6/2020 |
| JP | 6708318 B1 | 6/2020 |
| KR | 10-1224340 B1 | 1/2013 |
| KR | 10-2015-0011426 A | 2/2015 |
| KR | 10-1655089 B1 | 9/2016 |
| KR | 10-2017-0116377 A | 10/2017 |
| KR | 10-2019-0005408 A | 1/2019 |
| KR | 10-2019-0034868 A | 4/2019 |
| KR | 10-2019-0040414 A | 4/2019 |
| KR | 10-2019-0101286 A | 8/2019 |
| WO | 2014/097834 A1 | 6/2014 |

OTHER PUBLICATIONS

Office Action dated Jul. 25, 2023, issued in corresponding Japanese Patent Application No. 2022-548405.

International Search Report (with partial translation) and Written Opinion dated Oct. 13, 2021, for corresponding International Patent Application No. PCT/KR2021/007961.

Office Action issued on Apr. 30, 2025 in corresponding Chinese Patent Application No. 202180012342.3 (Note: KR 10-2019-0040414 A cited in this CN Office Action has already been cited in a prior IDS.).

* cited by examiner

PROVISIONING DEVICE AND METHOD FOR BATTERY STATE DIAGNOSIS AND ID ASSIGNMENT

TECHNICAL FIELD

Cross-Reference to Related Applications

This application claims the benefit of Korean Patent Application No. 10-2020-0079599, filed on Jun. 29, 2020 in the Korean Intellectual Property Office, the disclosure of which is incorporated herein in its entirety by reference.

Technical Field

The present invention relates to a provisioning device and method for battery state diagnosis and ID assignment.

BACKGROUND ART

In general, in the case of an EV vehicle battery, a battery management system (BMS) is provided for each module. Conventionally, such a battery management system assigns or manages the ID of each battery management system by wire through a hard wire type cable. However, since such a wired battery management system requires a separate cable, there is a problem in that the manufacturing cost increases and the volume increases.

In addition, a wireless battery management system has been devised to solve this problem, but in the case of a wireless battery management system, when individual ID assignment in real time is not possible and ID assignment is arbitrarily, there was a problem that individual maintenance and repair was difficult in case of failure because the location of the module was not known. In addition, when a unique network ID is required to additionally distinguish a wireless network, and an additional interface, for example, an infrared (IR) interface, is used for ID assignment, there was also a problem in that the production cost of the battery management system increased.

DISCLOSURE OF THE INVENTION

Technical Problem

The present invention is designed to solve the above problems, and an object of the present invention is to provide a provisioning device and method that can monitor the state of the battery and battery management system using a separate device when assembling the battery, efficiently assign the network ID and the ID of each battery management system, and reduce volume and cost.

Technical Solution

A provisioning device according to an embodiment of the present invention includes a communication module capable of communicating with a plurality of battery management systems included in the battery pack, and a processor, wherein the processor causes the communication module to wirelessly transmit a provisioning signal for switching at least one battery management system of the plurality of battery management systems to a provisioning mode, receives state information of the battery and the battery management system from the plurality of battery management systems through the communication module, and assigns an ID of a network of the battery pack and an ID of each of the battery management system based on the state information of the battery management system received through the communication module.

A method of diagnosing a state of a battery system using a provisioning device and assigning an ID according to an embodiment of the present invention includes wirelessly transmitting a provisioning signal for switching a system to a provisioning mode to at least one of a plurality of battery management systems included in the battery pack, receiving state information of the battery and the battery management system from each of the plurality of battery management systems, and assigning an ID of the network of the battery pack and an ID of each of the battery management system.

Effects of the Invention

According to the provisioning device and method of the present invention, when assembling the battery, the state of the battery and the battery management system can be monitored using a separate device, the network ID and the ID of each battery management system can be efficiently assigned, and the volume and cost can be reduced.

MODES FOR CARRYING OUT THE INVENTION

Figure 1:
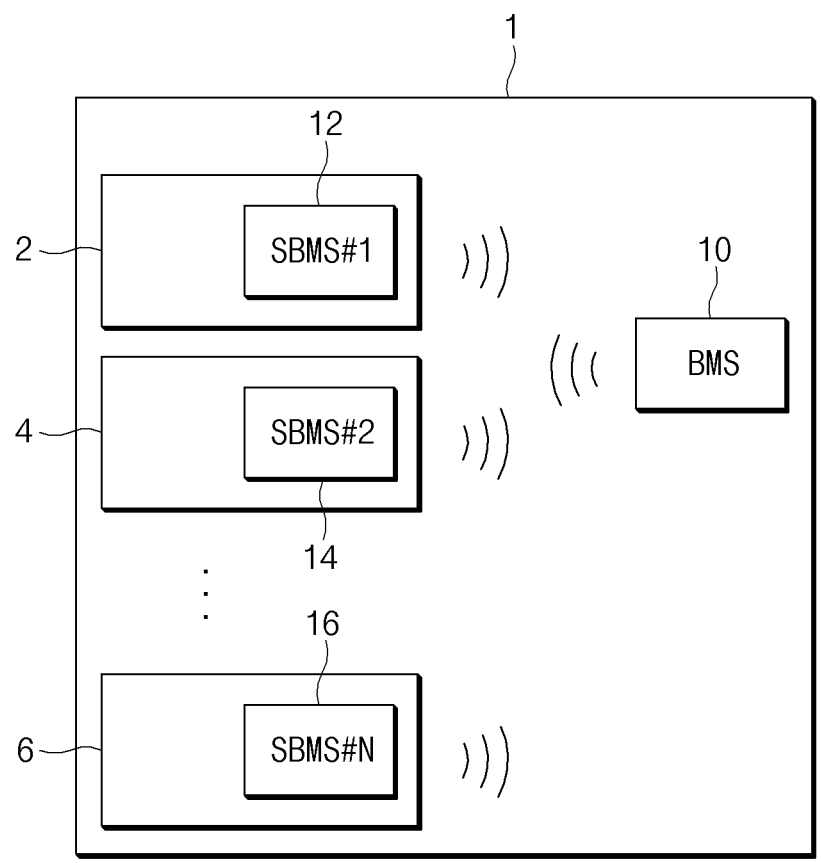
FIG. 1 is an exemplary configuration diagram of a battery pack including a battery management system according to an embodiment of the present invention.

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment and may not be intended to limit the scope of other embodiments. The terms of a singular form may include plural forms unless otherwise specified.

All terms used herein, including technical or scientific terms, may have the same meaning as commonly understood by a person of ordinary skill in the art. Terms defined in a commonly used dictionary may be interpreted as having the same or similar meaning as the meaning in the context of the related technology, and are not interpreted as ideal or excessively formal meanings unless explicitly defined in this document. In some cases, even terms defined in this document cannot be interpreted to exclude embodiments of the present invention.

FIG. 1 is a configuration diagram of a battery pack including a battery management system according to an embodiment of the present invention.

A plurality of battery modules 2, 4, and 6 are connected in series or in parallel in the battery pack 1. Slave battery management systems 12, 14, and 16 are respectively disposed in the battery modules 2, 4, and 6. Each slave battery management system 12, 14, and 16 monitors by measuring the temperature, voltage or current of the plurality of battery modules 2, 4, and 6, transmits the monitored information to the upper-level system, and receives the control command of the battery cell from the upper-level system to control the connected battery module.

A plurality of battery modules 2, 4, and 6 are connected in series or in parallel to form the battery pack 1. A master battery management system 10 is disposed in the battery pack 1. The master battery management system 10 measures and monitors the temperature, voltage or current of the battery pack 1. In addition, the master battery management system 10 receives the monitoring information of each battery module from the slave battery management systems 12, 14, and 16 respectively arranged in the battery module and transmits the received monitoring information to the upper-level system, and receives various commands from the upper-level system and transmits the received various commands to the corresponding slave battery management systems 12, 14, and 16.

Figure 2:
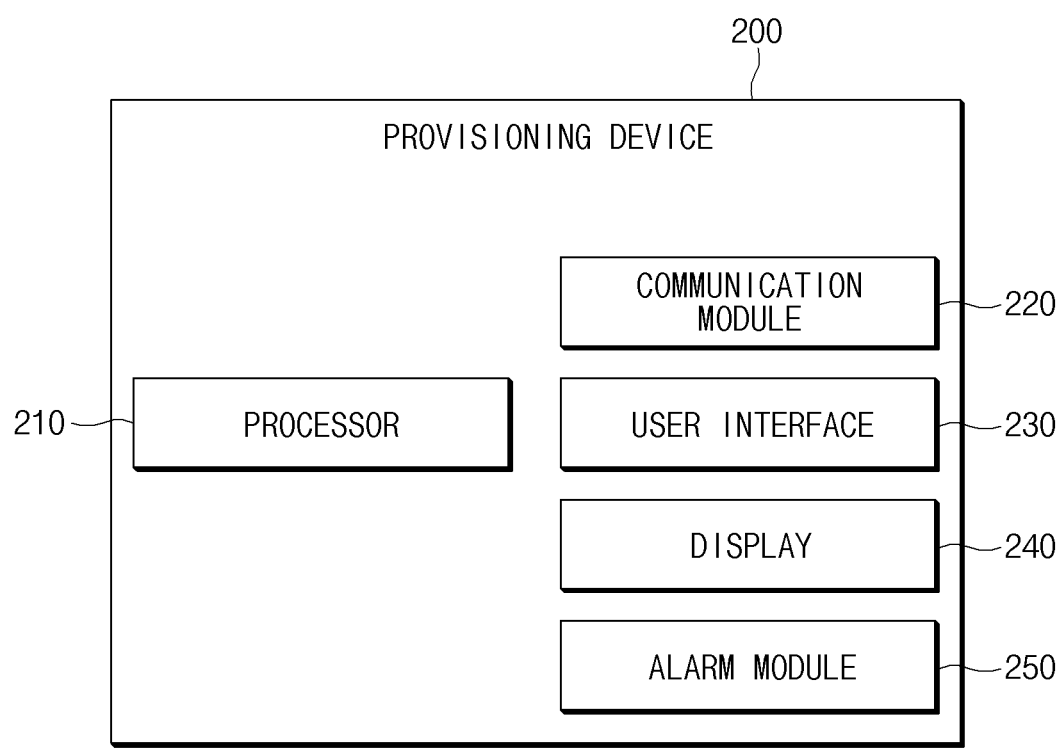
FIG. 2 is a block diagram showing the configuration of a provisioning device according to an embodiment of the present invention.

FIG. 2 is a block diagram showing the configuration of a provisioning device according to an embodiment of the present invention.

Referring to FIG. 2, a provisioning device 200 according to an embodiment of the present invention may include a processor 210, a communication module 220, a user interface 230, a display 240, and an alarm module 250.

The processor 210 may cause the communication module 220 to wirelessly transmit a provisioning signal for switching the system to a provisioning mode to at least one of a plurality of battery management systems included in the battery pack. Here, the provisioning mode refers to a series of processes of performing diagnosis on the battery management system and assigning IDs to the network and the corresponding battery management system. In this case, the provisioning device 200 of the present invention may operate in the provisioning mode only for the battery management system that has received the provisioning signal among the battery management systems.

The processor 210 may receive the battery and state information of the battery management system from the plurality of battery management systems through the communication module 220. In this case, the battery and state information of the battery management system received through the communication module 220 may be data that the battery management system monitors the battery module and the battery management system itself and is stored in a separate memory.

In addition, the provisioning signal transmitted through the communication module 220 may include a signal having a preset pattern. For example, the provisioning signal may cause transition to the provisioning mode only for a specific battery management system through a wake up tone signal, a jamming signal, or the like. After switching to the provisioning mode, the processor 210 may communicate through the communication module 220 through a command signal operable only in the provisioning mode. In addition, when the provisioning operation for the battery management system is terminated through the communication module 220, the processor 210 may transmit a provisioning termination command to the corresponding battery management system.

Also, the processor 210 may diagnose the state of the battery and the battery management system based on the state information of the battery and the battery management system. For example, the processor 210 may determine whether there is an abnormality based on whether state information such as voltage, current, temperature, pressure, and the like of the battery and the battery management system is out of a preset reference range.

In addition, the processor 210 may display the state information and diagnostic results of the battery and battery management system to the user through a graphic interface (e.g., the display 240) or transmit the state information and diagnostic results to an external server (not shown).

The processor 210 may assign an ID of the network of the battery pack and an ID of each of the battery management systems. In this case, the ID of the network of the battery pack and the ID of the battery management system may be directly set by the user through the user interface 230. In addition, the network ID and the ID of the battery management system may be randomly generated by the battery management system or generated by the battery supplier. In this case, the processor 210 may assign IDs of the network and the battery management system after diagnosing the state of the battery and the battery management system, and conversely, receive state information from the battery and the battery management system after assigning IDs of the network and the battery management system.

In addition, the processor 210 may assign network information (e.g., use frequency, etc.), an operating configuration value of the battery management system, and the like, in addition to the network ID and the ID of the battery management system.

On the other hand, when a provisioning signal is transmitted to the master battery management system among the plurality of battery management systems through the communication module 220, the processor 210 may assign an ID of the network and an ID of the master battery management system to the master battery management system. And, when the network is formed by the master battery management system, a provisioning signal is transmitted to the slave battery management system, and the ID of the network and the ID of the corresponding slave battery management system may be sequentially assigned to the slave battery management system.

The communication module 220 may communicate with a plurality of battery management systems included in the battery pack. For example, the communication module 210 may perform wireless communication in various ways, such as Wifi, Bluetooth, or NFC.

In addition, the communication module 220 may include a directional antenna for transmitting a signal to only one battery management system among the plurality of battery management systems. The directional antenna of the communication module 220 may enable communication with a battery management system in a short distance through an antenna guard for improving directivity.

The user interface 230 may receive, from the user, device settings, ID information of a network of the battery pack, ID information of each of a plurality of battery management systems, and an input related to a command for controlling the battery management system. That is, the user may provide various inputs for operating the provisioning device 200 through the user interface 230. For example, the user interface 230 may be configured in various forms, such as a keyboard, a mouse, and a touch pad.

The display 240 may display state information of a battery and a battery management system, an ID of a network of a battery pack, and ID information of each of the battery management systems. In addition, the display 240 may perform the function of the above-mentioned user interface 230 as a user interface.

The alarm module 250 may generate a warning notification when it is determined that an abnormality has occurred in at least one of the battery and the battery management system in the processor 210. At this time, the alarm module 250 may notify the user of an abnormality through a voice or a light signal. Meanwhile, in the provisioning device 200 according to an embodiment of the present invention, the alarm module 250 may be included in the user interface 230.

The provisioning device 200 according to the present invention may be performed on the same interface as communication between the battery management systems. Conventionally, an ID is assigned on a new interface (e.g., an IR communication device) by providing a separate device to assign an ID to the battery management system, but according to the provisioning device of the present invention, since ID can be assigned on the same interface as the communication interface of the existing battery management system, the cost for providing an additional interface can be reduced.

In addition, the provisioning device 200 of the present invention may be transportable by a user or a mobile device. For example, the user can directly carry the provisioning device 200 and perform the above-mentioned provisioning mode (diagnosis and ID assignment) by directly tagging the provisioning device 200 for each battery management system. Alternatively, a provisioning mode for each battery management system may be performed while the provisioning device 200 is mounted on a separate mobile device and moved.

On the other hand, the provisioning device 200 according to the present invention may be provided for each of a plurality of battery management systems instead of being directly transported by a user or a mobile device. That is, the provisioning device 200 is provided adjacent to each of the battery management systems, so that a user or a mobile device can automatically perform the provisioning mode without tagging while carrying it directly.

As such, according to the provisioning device 200 according to an embodiment of the present invention, when assembling the battery, the state of the battery and the battery management system can be monitored using a separate device, the network ID and the ID of each battery management system can be efficiently assigned, and the volume and cost can be reduced.

Figure 3:
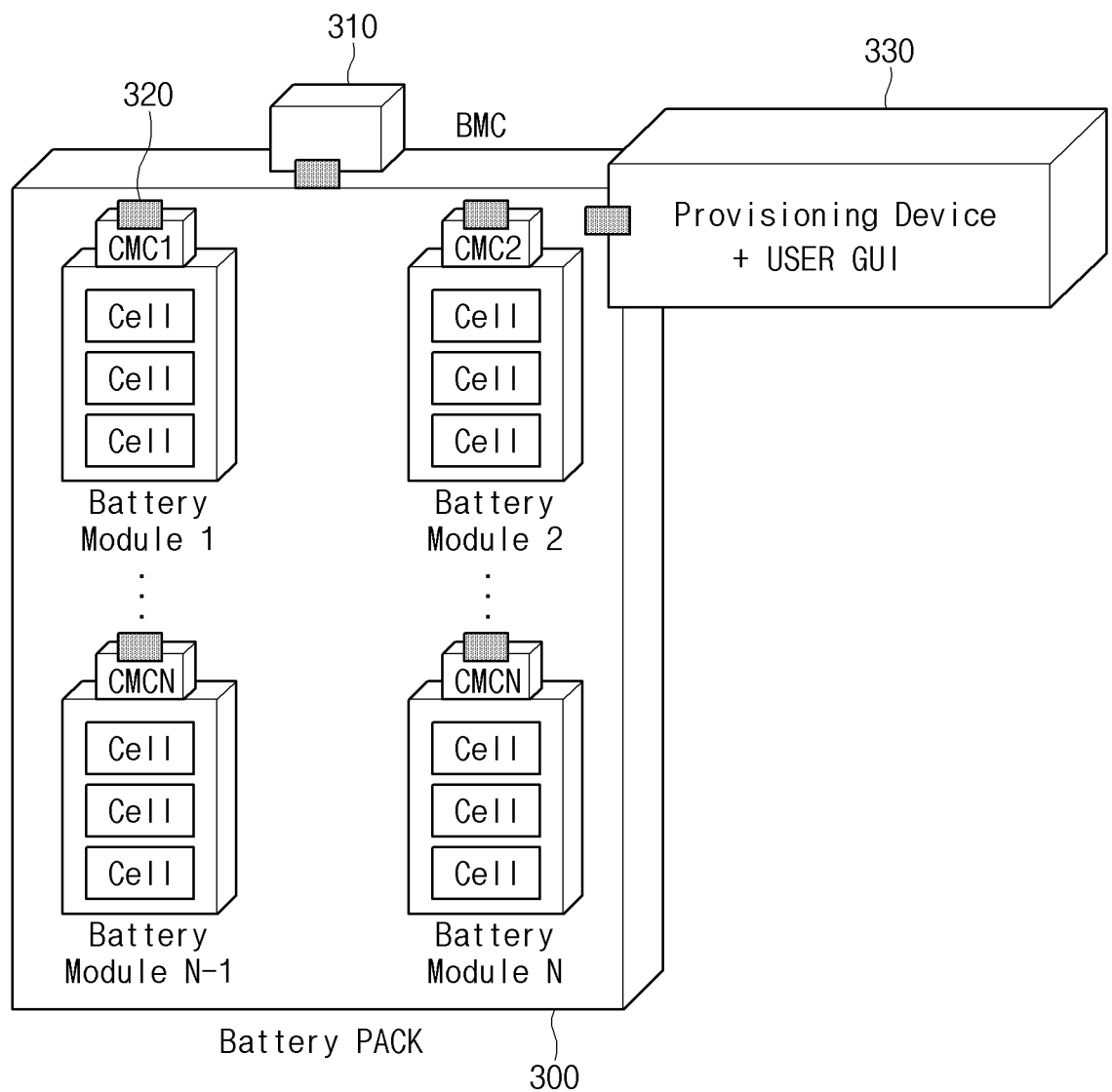
FIG. 3 is a diagram illustrating that a provisioning device according to an embodiment of the present invention operates with battery management systems of a battery pack.

FIG. 3 is a diagram illustrating that a provisioning device according to an embodiment of the present invention operates with battery management systems of a battery pack.

Referring to FIG. 3, a battery pack 300 according to an embodiment of the present invention may include a battery module controller (BMC) 310, a cell module controller (CMC) 320, and a provisioning device 330. Here, the BMC 310 may correspond to a master battery management system, and the CMC 320 may correspond to a plurality of slave battery management systems.

The CMC 320 performs a function of monitoring and controlling the state of a battery module including a plurality of battery cells. As shown in FIG. 3, each CMC 320 is provided for each battery module, and can detect state information such as voltage, current, temperature, and state of charge (SOC) of battery cells included in each battery module.

In addition, the BMC 310 may receive state information detected by each CMC 320 and transmit a command to each CMC 320 based on the information. That is, the BMC 310 may perform overall control of the battery module of the battery pack 300 and the battery management system.

As shown in FIG. 3, the provisioning device 330 according to the present invention may wirelessly communicate with the BMC 310 and CMCs 320 of the battery pack 300. That is, the provisioning device 330 may switch to the provisioning mode for each of the BMC 310 and CMC 320 as described above, and perform state diagnosis and ID assignment of the battery module, BMC 310 and CMC 320. Also, the provisioning device 330 may include a user graphic interface (GUI).

The provisioning device 330 of the present invention may use an ID obtained and input by the user in a separate system, or receive the ID generated by the BMC 310 or CMC 320 and use the received ID as the network ID and the ID of each BMC 310 or CMC 320. In this case, the ID of the CMC 320 may be sequentially assigned or may be directly input by the user.

In addition, the provisioning device 330 according to the present invention may perform state diagnosis of the BMC 310 and the CMC 320 and assign a network ID and an ID for each of the BMC 310 and CMC 320 to store the assigned IDs in a separate memory (not shown). In addition, the provisioning device 330 may perform network management and monitoring, and may add a new device or initialize the device. And, the provisioning device 330 according to an embodiment of the present invention is configured to upload various data such as a network ID and an ID for each of the BMC 310 and CMC 320 to an external server (not shown) or an electronic device (e.g., PC, user terminal, etc.) and manage the uploaded various data.

When the ID is assigned to both the BMC 310 and the CMC 320 by the provisioning device 330, the BMC 310 and the CMCs 320 set the assigned BMS ID as an address to form a network, and transmit/receive data on the state (battery cell/module voltage, temperature, etc.) of the battery and the battery management system and various commands (e.g., state monitoring command, cell balancing command, threshold value designation command for abnormality diagnosis, etc.).

Figure 4A:
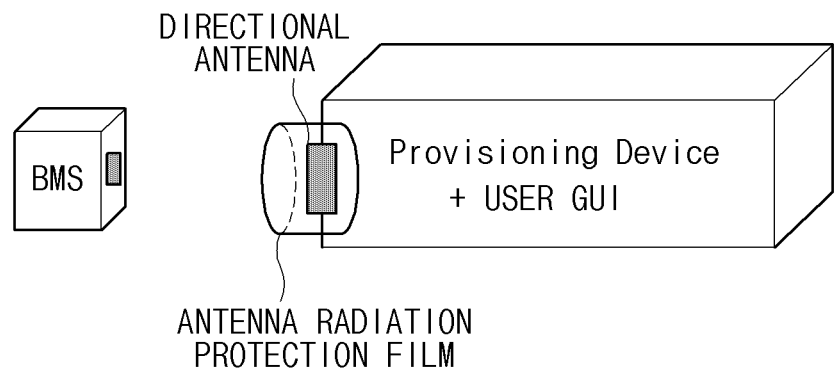
FIG. 4A is a diagram illustrating an exemplary configuration of a provisioning device according to an embodiment of the present invention.
Figure 4B:
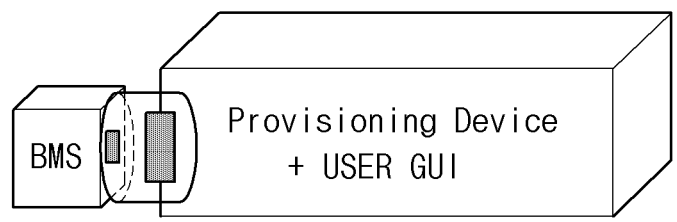
FIG. 4B is a diagram illustrating an example of a method of using a provisioning device according to an embodiment of the present invention.

FIG. 4A is a diagram illustrating an exemplary configuration of a provisioning device according to an embodiment of the present invention, and FIG. 4B is a diagram illustrating an example of a method of using a provisioning device according to an embodiment of the present invention.

Referring to FIG. 4A, the provisioning device according to an embodiment of the present invention may include a directional antenna for communication with the battery management system. Through this, the provisioning device can be configured to communicate only with a specific battery management system. In addition, the provisioning device can improve the directivity of communication by additionally providing an antenna radiation protection film of the directional antenna.

On the other hand, the user can perform functions such as device setting, network ID and device ID input, state monitoring, input of various commands, and automation script through the graphical user interface (GUI) of the provisioning device.

Referring to FIG. 4B, the provisioning device of the present invention may be placed in contact with or adjacent to the battery management system to perform provisioning. In this case, the provisioning device may be mounted on the battery management system, and provisioning may be performed in a way that the user tags while carrying it. In addition, each battery management system may include a receiver for receiving a signal from the provisioning device.

Figure 5:
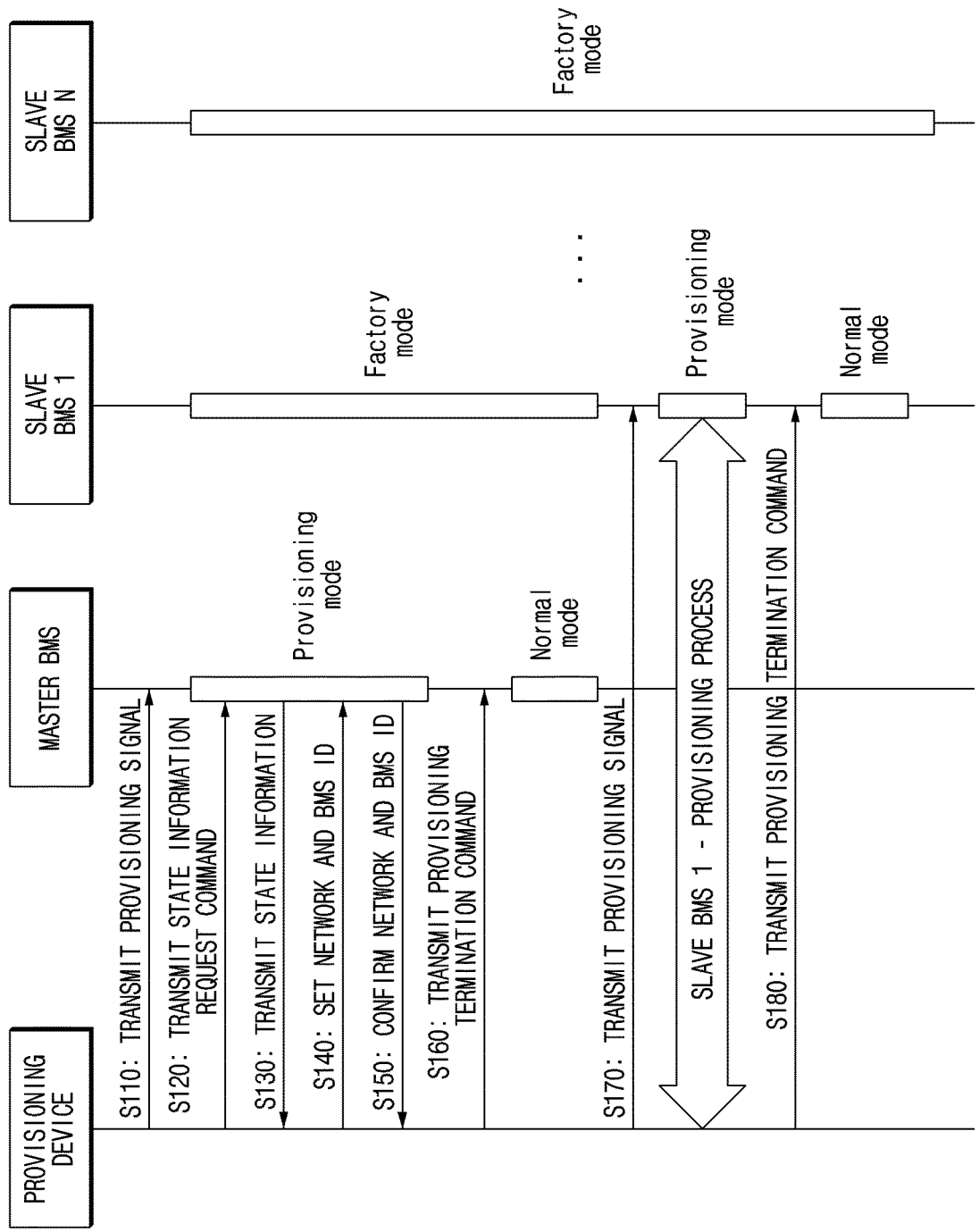
FIG. 5 is a diagram illustrating an operation of a provisioning device according to an embodiment of the present invention.

FIG. 5 is a diagram illustrating an operation of a provisioning device according to an embodiment of the present invention.

Referring to FIG. 5, first, the provisioning device transmits a provisioning signal to the master battery management system (S110). In this case, the provisioning signal may be a predetermined pattern signal. In addition, communication between the provisioning device and the battery management system may be performed in the same manner as the communication method between the battery management systems.

When receiving a provisioning signal from the provisioning device, the master battery management system enters the provisioning mode. Then, the provisioning device transmits a state information request command to the master battery management system (S120), and the master battery management system transmits state information (e.g., voltage, SOC, temperature, etc.) on the battery and the master BMS itself to the provisioning device (S130). In this case, the provisioning device may perform abnormality diagnosis on the battery and the battery management system by using the received state information.

Next, the provisioning device sets the network ID and the ID of the master battery management system (S140). Here, the network ID and the ID of the master battery management system may be directly set by the user or may be generated in the battery management system. When receiving the network ID and the battery management system ID, the master battery management system transmits a reception confirmation signal to the provisioning device again (S150). As such, when the provisioning process is all performed, the provisioning device transmits a provisioning termination command to the master battery management system (S160). When the provisioning mode ends, the master battery management system returns to the normal mode.

When the provisioning operation for the master battery management system is terminated, the provisioning device transmits a provisioning signal to the slave battery management system (S170). And, the provisioning operation for the slave battery management system is performed in the same manner as in the master battery management system. In this case, since the provisioning operation for the slave battery management system is substantially the same as in steps S120 to S150, a detailed description thereof will be omitted. When all provisioning operations for the slave battery management system are finished, the provisioning device transmits a provisioning termination command to the slave battery management system (S180).

On the other hand, when the provisioning operation for the first slave battery management system is terminated, the provisioning device switches the corresponding slave battery management system to the normal mode and sequentially performs provisioning operations for the next slave battery management system.

As such, when IDs are assigned to all master and slave battery management systems by the provisioning device, the battery management systems can transmit and receive data and commands by setting the assigned BMS ID as an address to form a network. For example, the slave battery management system may transmit data on the battery module and the state (battery cell/module voltage, temperature, etc.) of the battery module and the battery management system to the master battery management system, and the master battery management system may transmit various commands (e.g., a state monitoring command, a cell balancing command, a threshold value designation command for abnormality diagnosis, etc.) to the slave battery management system.

Figure 6:
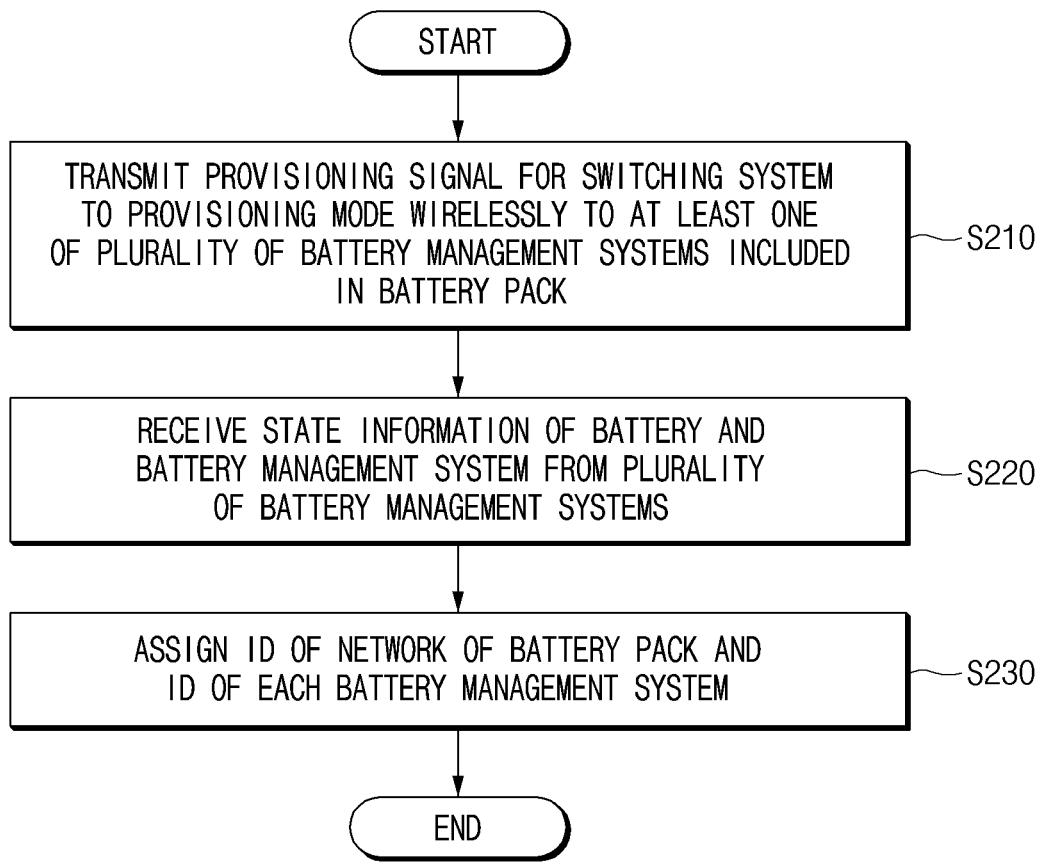
FIG. 6 is a flowchart illustrating a provisioning method according to an embodiment of the present invention.

FIG. 6 is a flowchart illustrating a provisioning method according to an embodiment of the present invention.

Referring to FIG. 6, first, a provisioning signal for switching the system to a provisioning mode is wirelessly transmitted to at least one of a plurality of battery management systems included in a battery pack through a provisioning device (S210). In addition, the provisioning signal may be switched to the provisioning mode only for a specific battery management system through a preset pattern signal such as a wake up tone signal and a jamming signal.

In addition, in step S210, communication may be enabled only with respect to a target battery management system through a directional antenna for transmitting a signal only for a specific battery management system among a plurality of battery management systems and an antenna guard for improving directivity.

Then, state information of the battery and the battery management system is received from the battery management system switched to the provisioning mode (S220). In this case, in step S220, the state of the battery and the battery management system may be diagnosed based on the state information of the battery and the battery management system. For example, it may determine whether there is an abnormality based on whether state information such as voltage, current, temperature, pressure, and the like of the battery and the battery management system is out of a preset reference range. In addition, state information and diagnosis results of the battery and the battery management system performed in step S220 may be displayed to the user through a graphic interface or transmitted to an external server.

Next, the ID of the network of the battery pack and the ID of each battery management system are assigned (S230). In this case, the ID of the network of the battery pack and the ID of the battery management system may be directly set by a user through an input module or may be generated by the battery management system itself.

In addition, in step S230, when a provisioning signal is transmitted to the master battery management system among the plurality of battery management systems through the communication module 220, the processor 210 may assign an ID of the network and an ID of the master battery management system to the master battery management system. And, when the network is formed by the master battery management system, a provisioning signal is transmitted to each of the slave battery management systems among the plurality of battery management systems, and the ID of the network and the ID of the corresponding slave battery management system may be sequentially assigned to each of the slave battery management systems.

In FIGS. 5 and 6, it has been described that the provisioning device performs ID assignment of the network and the battery management system after monitoring for each battery management system, but the present invention is not limited thereto, and after assigning the ID of the network and the battery management system, monitoring can also be performed.

Meanwhile, although not shown in FIG. 6, the provisioning method according to an embodiment of the present invention displays state information of a battery and a battery management system, an ID of a network of a battery pack, and ID information of each of the battery management systems so that it is possible for users to directly check data.

In addition, the provisioning method according to an embodiment of the present invention may notify the user of the danger by generating a warning notification when it is determined that an abnormality has occurred in at least one of the battery and the battery management system through step S220.

As such, according to the provisioning method of the present invention according to an embodiment of the present invention, when assembling the battery, the state of the battery and the battery management system can be monitored using a separate device, the network ID and the ID of each battery management system can be efficiently assigned, and the volume and cost can be reduced.

Figure 7:
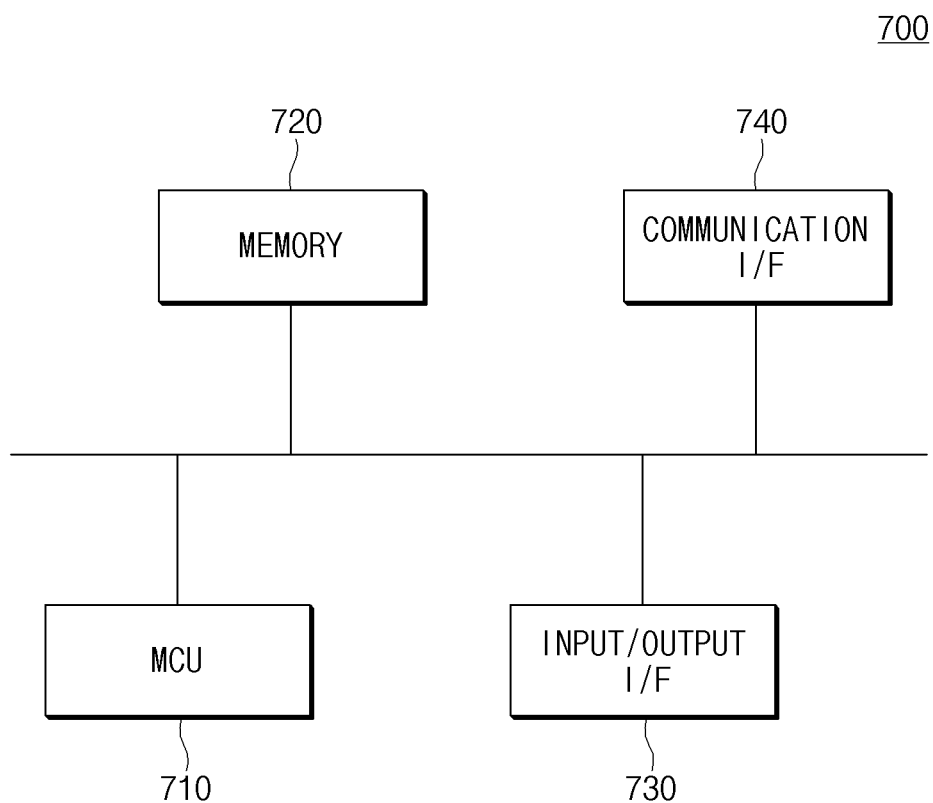
FIG. 7 is a diagram illustrating a hardware configuration of a provisioning device according to an embodiment of the present invention.

FIG. 7 is a diagram illustrating a hardware configuration of a provisioning device according to an embodiment of the present invention.

Referring to FIG. 7, the provisioning device 700 may include a microcontroller (MCU) 710 for controlling various processes and each configuration, a memory 720 in which an operating system program and various programs (e.g., a battery and battery management system diagnosis program, an ID assignment program, etc.) are recorded, an input/output interface 730 that provides an input interface and an output interface between the battery cell module and/or the semiconductor switching element, and a communication interface 740 capable of communicating with the outside through a wired/wireless communication network. In this way, the computer program according to the present invention may be recorded in the memory 720 and processed by the microcontroller 710, and for example, may be implemented as a module that performs each functional block shown in FIG. 2.

In the above, even if all the components constituting the embodiments of the present invention are described as being combined into one or operating in combination, the present invention is not necessarily limited to these embodiments. That is, within the scope of the object of the present invention, all of the constituent elements may be selectively combined and operated in one or more.

In addition, terms such as "include", "consist of" or "have" described above mean that the corresponding constituent components can be present unless otherwise stated, and it should be construed that other components may be further included rather than excluding other components. All terms, including technical or scientific terms, have the same meaning as commonly understood by one of ordinary skill in the art, unless otherwise defined. Terms commonly used, such as terms defined in the dictionary, should be interpreted as being consistent with the meaning of the context of the related technology, and unless explicitly defined in the present invention, they are not interpreted in an ideal or excessively formal sense.

The above description is merely illustrative of the technical idea of the present invention, and those of ordinary skill in the art to which the present invention pertains will be able to make various modifications and variations without departing from the essential characteristics of the present invention. Therefore, the embodiments disclosed in the present invention are not intended to limit the technical idea of the present invention, but to explain, and the scope of the technical idea of the present invention is not limited by these embodiments. The scope of protection of the present invention should be interpreted by the claims below, and all technical ideas within the scope equivalent thereto should be construed as being included in the scope of the present invention.

The invention claimed is:

1. A provisioning device, comprising:
   a communication module capable of wirelessly communicating with a plurality of battery management systems included in a battery pack; and
   a processor configured to:
   cause the communication module to wirelessly transmit a provisioning signal for switching at least one of the plurality of battery management systems to a provisioning mode,
   receive battery and battery management state information from each of the plurality of battery management systems through the communication module, and
   assign an ID of a network of the battery pack and an ID of each of the plurality of battery management systems in the battery pack based on the battery and battery management system state information received through the communication module.

2. The provisioning device of claim 1, wherein the communication module comprises a directional antenna for transmitting a signal for only one battery management system among the plurality of battery management systems.

3. The provisioning device of claim 1, further comprising a display for displaying at least one of the battery and the battery management system state information, the ID of the network of the battery pack, and the ID of each of the battery management systems.

4. The provisioning device of claim 1, wherein the communication module is configured to communicate with the plurality of battery management systems on a same communication interface as a communication between the plurality of battery management systems.

5. The provisioning device of claim 1, wherein the ID of the network and the ID of each of the battery management systems are set based on a user input or are generated by at least one of the plurality of battery management systems.

6. The provisioning device of claim 1, wherein the battery pack further includes a battery corresponding to a respective one of the battery management systems, and
   wherein the processor is further configured to diagnose a state of each of the battery management systems and the corresponding battery based on the corresponding battery and the battery management system state information.

7. The provisioning device of claim 6, further comprising an alarm module for generating a warning notification when the processor determines that at least one of the battery and the corresponding one of the battery management systems has an abnormality.

8. The provisioning device of claim 1, wherein the processor is further configured to transmit the battery and the battery management system state information to an external server through the communication module.

9. The provisioning device of claim 1, wherein the plurality of battery management systems include a master battery management system and a plurality of slave battery management systems, and
wherein the processor is further configured to:
assign the ID of the network and an ID of the master battery management system to the master battery management system when the provisioning signal is transmitted to the master battery management system through the communication module, and
when the network is formed by the master battery management system, transmit the provisioning signal to each of the slave battery management systems through the communication module, and the ID of the network and a slave battery management system ID to each of the slave battery management systems.

10. The provisioning device of claim 9, wherein the processor is further configured to sequentially assign the ID of the network and the slave battery management system ID to each of the slave battery management systems.

11. The provisioning device of claim 1, wherein the provisioning signal comprises a signal having a preset pattern.

12. The provisioning device of claim 1, wherein the processor is further configured to transmit a provisioning termination command to the at least one of the battery management systems through the communication module when the provisioning mode for the at least one of the battery management systems is terminated.

13. The provisioning device of claim 1, wherein the provisioning device is transportable separately from the battery pack.

14. A method of diagnosing a state of a battery pack using a provisioning device and assigning an ID, the method comprising:
wirelessly transmitting a provisioning signal to at least one of a plurality of battery management systems included in the battery pack to switch the at least one of the plurality of battery management systems to a provisioning mode;
receiving battery and battery management system state information from the at least one of the plurality of battery management systems; and
assigning an ID of a network of the battery pack and an ID of the at least one of the plurality of battery management systems in the battery pack.

15. The method of claim 14, further comprising:
transmitting the assigned ID of the network of the battery pack and the assigned ID of the at least one of the battery management systems to the at least one of the plurality of battery management systems;
receiving a confirmation from the at least one of the battery management systems of a receipt of the assigned ID of the network of the battery pack and the assigned ID of the at least one of the battery management systems; and
transmitting a provisioning termination command to the at least one of the battery management systems to switch the at least one of the battery management systems from the provisioning mode to a normal mode.

16. The provisioning device of claim 15, wherein the user interface is further configured to receive as another input, from the user, at least one of a device setting and a command for controlling at least one of the battery management systems.

17. The provisioning device of claim 1, further comprising:
a user interface configured to receive as an input, from a user, at least one of the ID of the network of the battery pack and the ID of each of the plurality of battery management systems.

18. The provisioning device of claim 17, wherein the at least one of the ID of the network of the battery pack and the ID of each of the plurality of battery management systems is directly set by the user via the user interface.

19. The provisioning device of claim 13, wherein the provisioning device is physically disconnected from the battery pack.

20. The provisioning device of claim 1, wherein the network of the battery pack is a wireless network.

* * * * *